Nov. 9, 1954 P. F. G. HOLST 2,694,161
LINEARITY CONTROL FOR TELEVISION RECEIVERS
Filed May 8, 1953
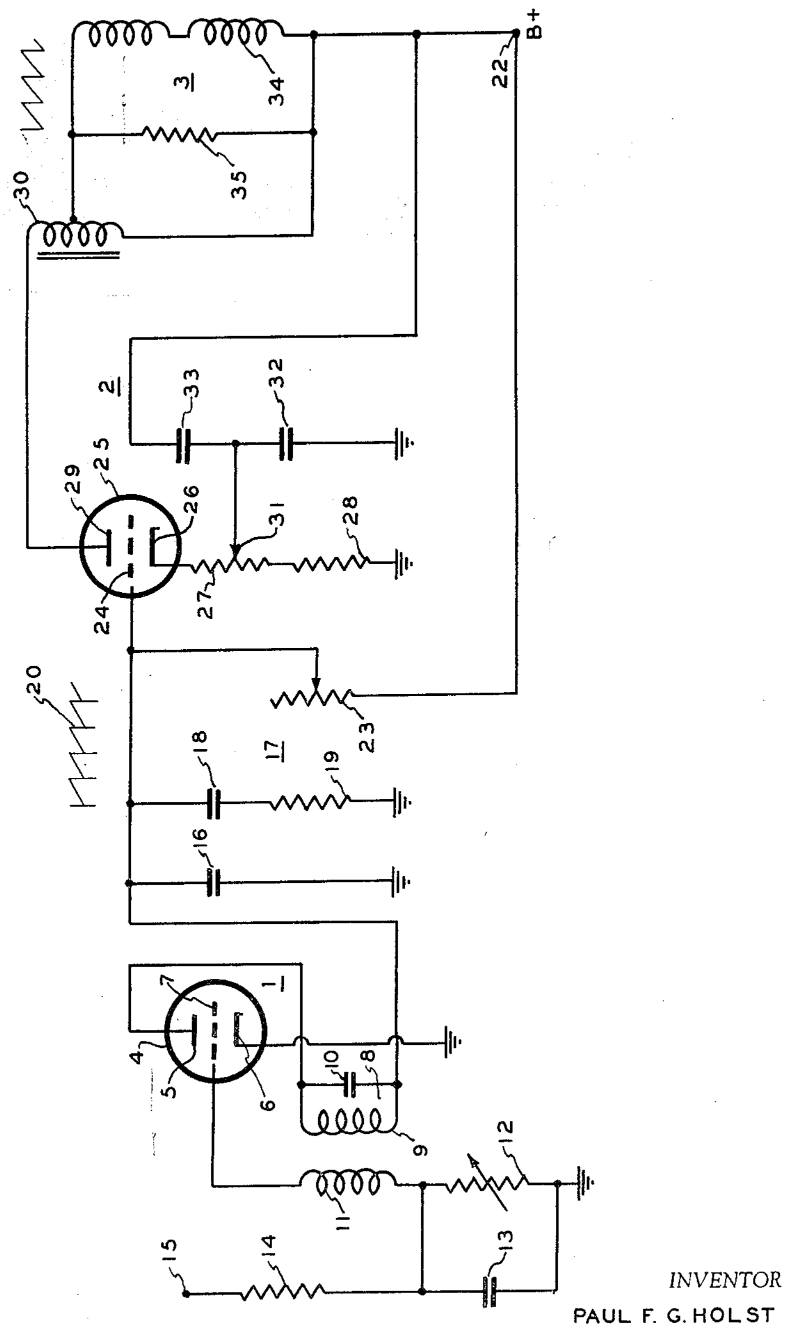
INVENTOR
PAUL F. G. HOLST
BY Alden D. Redfield
ATTORNEY United States Patent Office 2,694,161

Patented Nov. 9, 1954

2,694,161

LINEARITY CONTROL FOR TELEVISION RECEIVERS

Paul F. G. Holst, Mount Healthy, Ohio, assignor to Avco Manufacturing Corporation, Cincinnati, Ohio, a corporation of Delaware Application May 8, 1953, Serial No. 353,859

11 Claims. (Cl. 315—27)

The present invention relates generally to electronic power amplifier circuits, and more particularly to improved power amplifier circuits for providing linear sawtooth current waves to the vertical deflection systems of cathode ray picture tubes of television receivers.

Television receivers which employ magnetically deflected cathode ray picture tubes require sawtooth deflection currents of relatively high magnitude, and of substantially perfect linearity. To this end a power amplifier of the electronic type is conventionally employed to supply sawtooth current to a picture tube deflection system, the driving means for the amplifier being a sawtooth oscillator, synchronized from the vertical synchronizing signals present in conventional television transmissions. The amplifier tube drives an output transformer, to which is connected the vertical deflection yoke. This output transformer possesses an iron core, and is therefore not a linear device, having generally a slope of negative curvature. The amplifier tube itself possesses generally a slope having positive curvature. The transformer and amplifier have, therefore, curvatures of mutually compensating types, but these curvatures do not, in the absence of special and suitable operating conditions, offset each other quantitatively.

It has been known to provide sawtooth current output amplifiers with a linearity control, designed to enable selection of a portion of the amplifier characteristic which balances, in its curvature, the curvature of the output transformer driven by the amplifier. Linearity controls of this type frequently rely on variation of amplifier tube bias, to accomplish shift of amplifier operating point. The shift in operating point varies the amplification of the power amplifier, so that it may be necessary to provide means for varying the output of the amplifier to compensate for changes in output caused by variation of the linearity control.

Variation of amplifier tube bias effects, in addition to a change in amplification, a variation of D. C. tube current, which in turn affects the saturation of the output transformer, and hence its inductance. Assume, for example, that the operating point is shifted in such a manner as to cause the tube to increase its current consumption. Such shift provides a tube characteristic with a more positive curvature and also causes the transformer to saturate more, so that the transformer loses inductance resulting in a slope with a more negative characteristic, since the transformer consumes the current which would otherwise flow into the yoke. Variation of bias results, therefore, in variation of third harmonic content of sawtooth scanning current, in addition to amplitude of output.

In accordance with the present invention, the vertical deflection amplifier tube, of a television receiver employing a magnetically deflected cathode ray picture tube, is provided with a fixed bias resistance, which adjusts the bias of the tube to an optimum value, in respect to third harmonic elimination, and means is provided for adjusting solely the magnitude of a degenerative feedback voltage for the tube to linearize the response.

In order to eliminate third harmonic distortion a preselected fixed bias resistance is connected in series with the cathode of the power amplifier, with a by-pass condenser in shunt, to provide a fixed and relatively critical value of bias voltage suitable for elimination of the undesirable third harmonic effect, in the particular amplifier design. It is found that, for a given value of line voltage applied to the television receiver, a fixed bias voltage can be selected, which reduces third harmonic distortion within acceptable limits, for tubes and out put transformers having reasonable manufacturing tolerances. The selected value may not be optimum, however, for values of line voltage which materially exceed the standard value, or which materially fall below the standard value, and it is found that this effect can be compensated by varying the bias resistance as a function of line voltage.

It is known practice, in the prior art, to connect the control grid of the vertical deflection power amplifier of a magnetic deflection cathode ray picture tube directly to the anode of the scanning oscillator, in order to minimize transfer losses and distortions in coupling networks. The control grid thus has a positive operating point, with respect to ground.

A cathode resistance is provided for the power amplifier, shunted by a by-pass condenser, and the cathode is connected to a variable point along the resistance, one end of which is grounded.

The portion of the resistance between cathode and ground establishes grid bias, while the resistances from the tap point to the cathode and from the tap point to ground in parallel connection control the degenerative feed-back for the amplifier tube.

In one well-known prior art system, any change in tube bias in one sense, accomplished by varying the position of the cathode tap, is offset by a change in degeneration in the opposite sense, i. e. a decrease in bias is accompanied by an increase in degeneration, and vice-versa. It is intended by this system to render vertical sweep amplitude independent of linearity control setting.

While circuits operating in this manner are known, per se, and are effective, it is found in practice that the compensatory effects are difficult to control quantitatively so that variations of tube operating point and hence of amplification, due to bias modification, will be precisely offset by feed-back variation. It is found, as a result of tests conducted on receivers produced in quantity, and by substitution of power amplifier tubes in a given receiver, that considerable nonlinearity remains in the vertical scan, in many of the tests, due to the fact that variation of tube operating point and tube gain, due to bias variation, are offset only in part by variation of degeneration over the variational range of the system, due to the further fact that third harmonic distortion effects introduced by bias variation are not compensated by variation of degeneration, and due to the still further fact that it is difficult to compensate for curvature of tube characteristic at all settings of the linearity control, for tubes selected at random. As a further important fact, the by-pass condenser circuit includes a series resistance of variable magnitude, which may be relatively large for some settings of the linearity control.

In accordance with the present invention the cathode bias resistance consists of a fixed portion, and a further relatively small resistance in series therewith. Both resistances are connected in series between cathode and ground, and degeneration may be varied by connecting a by-pass condenser between ground and a variable point on the relatively small resistance. This type of operation implies that the operating point of the amplifier, on its plate current-grid voltage characteristic, is fixed and that linearity control is accomplished solely in terms of degeneration control. Maintenance of amplitude of vertical scan currents is no longer a function of the linearity control setting, but is accomplished by varying the amplitude of output of the scanning or sawtooth oscillator, as necessary. Insofar as linearity control settings do affect vertical amplitude, compensation is accomplished at the oscillator output amplitude control. However, this is found to be a second order effect. The cathode bias resistance, being fixed, and not subject to control, can be selected for optimum third harmonic elimination, and thereafter remains fixed during linearity control. The cathode bias resistance is by-passed by a condenser only, and not by a variable impedance circuit including resistance and capacitance in series. Relatively extensive tests have demonstrated that operation with fixed bias voltage, selected for minimum third harmonic distortion, together with variable degenerative feed-back, results in maximum possibility of attaining vertical linearity, in mass produced receivers.

It is, accordingly, an object of the present invention to provide a novel system for controllably linearizing the output of a power amplifier which supplies the vertical scanning circuit of a magnetically deflected cathode ray picture tube.

It is a further feature of the invention to provide a linearity control for a sweep power stage which includes a fixed negative bias for the stage, together with variable degeneration, the bias resistance being selected to minimize harmonic distortion in the stage.

It is a further object of the invention to provide a linearity control for a power amplifier tube which drives an inductive load, the inductive load having inductance variable with direct current in the tube, and the tube grid being directly connected to the anode of a driver oscillator tube, wherein bias for the amplifier tube is provided by a fixed cathode resistance selected to minimize third harmonic distortion, and wherein linearity control is provided by deriving variable degenerative voltage from a portion of the bias resistance, which is unfiltered.

The above and still further features, objects and advantages of the present invention will become apparent upon consideration of the following detailed disclosure of a preferred modification thereof, especially when taken in conjunction with the accompanying drawings, wherein the single figure is a schematic circuit diagram of a vertical sweep power amplifier, with its driver oscillator and inductive load, employed to supply vertical sweep current to a magnetically deflected cathode ray picture tube, in accordance with the invention.

Referring now more particularly to the accompanying drawings, the reference numeral 1 denotes generally a vertical sweep oscillator, the reference numeral 2 is a vertical sweep amplifier driven by the sweep oscillator 1, and the reference numeral 3 an inductive output load for the amplifier 2.

The sweep oscillator 1 comprises a blocking tube 4 having an anode 5, a cathode 6, and a control electrode 7. Connected between anode 5 and the remainder of the plate load is a parallel combination of a transformer winding 9 and capacitor 10. This oscillator circuit is only illustrative of the various types of oscillators that may be used. The plate winding 9 is inductively coupled with a winding 11, connected in series between control electrode 7 and a variable resistance 12, the latter having one end grounded. The resistance 12 is shunted by a condenser 13, and connected, in series with a fixed resistance 14, to a synchronizing signal input terminal 15.

Connected between ground and the lead of winding 9 remote from the anode 5 is a condenser 16, which periodically discharges through the tube 4, during the operation of the sweep oscillator 1. Connected in parallel with the condenser 16 is a conventional peaking circuit 17, comprising a condenser 18 and a resistance 19 in series.

Anode voltage is supplied to the tube 4 from a B+ terminal 22, via a variable charging resistance 23, the adjustment of which determines the amplitude of output of the sweep oscillator 1.

It is the function of the tuned circuit 8 to control the natural frequency of the oscillator 1. The variable resistance 12 serves to control the time-constant of the capacitance-resistance combination 12, 13, which in turn controls the natural frequency of the oscillator. Variable resistance 12 accordingly serves as a frequency control element, and thus as a vertical hold control for the receiver.

In operation, the condensers 16, 18 are charged in series with variable resistance 23, to generate the sawtooth rise of the waveform 20, the tube 4 remaining nonconductive. The magnitude of resistance 23 determines the rate of rise of the sawtooth. At fixed intervals, and in response to synchronizing impulses supplied at terminal 15, the tube 4 is caused to become conductive, discharging the condensers 16, 18, and generating the fly-back portion of the wave form 20. The amplitude attained by the sawtooth wave form 20 at the time of discharge of the condensers 16, 18 is thus determined by the magnitude of resistance 23, and the latter constitutes effectively a vertical sweep amplitude control, or vertical picture size control.

The sweep oscillator 1 drives the power amplifier 2, and to that end the anode 5 of the tube 4 is connected with the control electrode 24 of the amplifier tube 25, furnishing the latter with voltage corresponding with the wave form 20. The cathode 26 of the amplifier tube 25 is connected to ground via two series resistances, 27 and 28, the former being relatively small and the latter relatively large. The anode 29 of the tube 25 is connected in series with a step-down auto transformer, 30, to the B+ terminal 22.

D. C. tube current flows in the series cathode resistances 27, 28, which provides a fixed bias for the tube 25. Since fixed resistance 28, and a portion of resistance 27, are shunted by a condenser 32, say of about 30 mfd., the voltage across the shunted portion of these resistances is smoothed or leveled.

The portion of resistance 27, taken between cathode 26 and variable tap 31, being unbypassed, the potential of cathode 26 varies with respect to the fixed potential of tap 31, in dependence on sawtooth plate current flow in the tube 25. This variation of potential constitutes variable cathode degeneration in tube 25, the amount of degeneration being variable in accordance with the setting of variable tap 31. Condenser 33 serves as a by-pass to ground, via condenser 32, for undesired high frequency components present at terminal 22.

The value of the degenerative resistance 27 is selected to enable compensation for non-linearity of output of tube 25, by variation of tap 31, for the range of tube characteristics and output load variations likely to be encountered in mass produced receivers.

The numeral 34 identifies the vertical deflection coils of the system, connected between a center tap of auto-transformer 30 and the B+ terminal 22. A damping resistance 35 is shunted across the deflection coils 34, in conventional fashion.

Values of resistances 27, 28 and condensers 32, 33, which have been adopted in one specific embodiment of the present invention, and tested in practice, are as follows:

| | |
|---|---|
| Resistance 27 | 750 ohms. |
| Resistance 28 | 8700 ohms. |
| Condenser 32 | 30 mfd. |
| Condenser 33 | 20 mfd. |
| Tube type, tube 25 | 17BH7 |

It will be realized that the specific values recited are those found to be optimum for a specific deflection circuit design, and that the invention is intended to comprehend other specific circuit values, provided the circuit operates in accordance with the principles of the invention.

What I claim and desire to secure by Letters Patent of the United States is:

1. In a vertical deflection circuit for a magnetically deflected cathode ray tube, a scanning oscillator having an anode, a vertical deflection amplifier having an anode, a cathode and a control electrode, a direct current connection from said anode of said scanning oscillator to said control electrode, a first relatively small resistance in series with said cathode, and having one terminal connected directly to said cathode, a second relatively large resistance in series with said first resistance and having one terminal connected with a point of reference potential, a smoothing condenser, an inductive load for said amplifier and comprising an iron core inductance, and means directly connecting said smoothing condenser between a variable point of said first relatively small resistance and said point of reference potential, said resistors being so connected as to provide a fixed cathode bias.

2. In a vertical deflection circuit for a magnetically deflected cathode ray tube, an electronic tube scanning oscillator, said electronic tube comprising an anode, a condenser having one terminal connected to said anode, a charging resistance for charging said condenser from a positive voltage terminal, a vertical deflection amplifier for amplifying the output of said scanning oscillator, said vertical deflection amplifier comprising a vacuum tube having at least an anode, a cathode and a control electrode, a direct current connection from said control electrode to said anode of said electronic tube, an inductive load connected between said positive voltage terminal and said anode of said vacuum tube, said inductive load comprising an iron core auto-transformer, and deflecting coils energized from said iron core auto-transformer, a cathode circuit for said vacuum tube comprising means for generating a fixed and invariable bias selected to minimize harmonic distortion in said amplifier, and means for generating a cathode degeneration linearizing voltage for said amplifier, said last means comprising a fixed cathode resistance, a variable tap for said resistance and a by-pass condenser directly connected between said variable tap and a point of reference potential, said cathode being permanently conductively connected to an end terminal of said fixed resistance.

3. In a vertical deflection circuit for a magnetically deflected cathode ray tube, an electronic tube scanning oscillator comprising an anode, a charging condenser having one terminal connected to said anode, a charging resistance in series with said condenser for charging said condenser from a voltage source, and means for periodically discharging said condenser through said electronic tube, a vertical deflection power amplifier for amplifying the output of said scanning oscillator, said vertical deflection power amplifier comprising a vacuum tube having an anode, a cathode and a control electrode, a direct current connection between said control electrode and said anode of said electronic tube scanning oscillator, means for providing a fixed bias for said vacuum tube, said means consisting of a first and a second resistance connected in series between and with end terminals connected to said cathode and a point of reference potential, an inductive load for said vacuum tube, said inductive load comprising an iron core inductance in series with the anode of said vacuum tube, said first and second resistance selected to provide a fixed resistance designed to provide a fixed bias which minimizes harmonic distortion in said power amplifier, and means for providing a linearity control for said power amplifier comprising a cathode degeneration control circuit for said vacuum tube.

4. The combination in accordance with claim 3 wherein said cathode degeneration control circuit comprises a by-pass condenser connected between an adjustable contact associated with one of said resistances and said point of reference potential.

5. A deflection system for providing a sawtooth current wave at a frequency of substantially sixty cycles per second for a magnetic deflection system of a cathode ray tube, comprising, a power output circuit including a power output amplifier tube having an anode, a cathode and a grid, means for applying a peaked sawtooth voltage to said grid, an iron core deflection transformer connected to said anode, said transformer having a current response of negative curvature to a sawtooth voltage and said amplifier tube, a current response of positive curvature to a sawtooth voltage, said transformer further introducing variable undesired harmonic response in accordance with D. C. current flow therein, means comprising cathode resistance having an end terminal connected to said cathode for providing a fixed and invariable D. C. bias for said amplifier tube selected to minimize said undesired harmonic response, and means for providing a variable degenerative feedback for said amplifier tube, adjustable to linearize the composite response of said amplifier tube and said transformer without varying said fixed bias.

6. A deflection system in accordance with claim 5 wherein said means for providing a fixed and invariable bias consists of a relatively small fixed resistance having one end connected to said cathode, and a relatively large fixed resistance connected between the remaining end of said relatively small resistance and a point of reference potential, and wherein said means for providing a variable degenerative feed-back includes a by-pass condenser directly connected between an adjustable tap taken along said relatively small fixed resistance and said point of reference potential.

7. A deflection system in accordance with claim 5 wherein said means for providing a fixed and invariable D. C. bias consists of a fixed cathode resistance for said amplifier tube, and wherein said means for providing a variable degenerative feed-back includes a portion of said resistance.

8. A deflection system in accordance with claim 5 wherein said means for providing a fixed and invariable D. C. bias consists of fixed cathode resistance for said amplifier tube, and wherein said means for providing variable degenerative feed-back includes a by-pass condenser shunted across a selectable portion of said fixed resistance.

9. A magnetic deflection system for a cathode ray tube including in combination, an amplifier comprising a vacuum tube, having an input circuit and an output circuit, a load for said output circuit comprising an inductance which introduces non-linearity of negative curvature and third harmonic distortion into the response of said amplifier, said vacuum tube introducing non-linearity of positive curvature into the response of said amplifier, means for applying a sawtooth voltage in said input circuit, means for substantially eliminating said third harmonic distortion by providing preselected fixed and invariable bias for said amplifier tube, and means for linearizing the composite curvature of said vacuum tube and said inductance comprising means for providing an adjustable degeneration control in said amplifier, the settings of said degeneration control having no effect on said bias throughout a range of such settings.

10. A magnetic deflection system for a cathode ray tube, comprising a deflection amplifier, said deflection amplifier including an amplifying vacuum tube, means for applying sawtooth voltage to drive said amplifier, a load for said vacuum tube including an iron core coil in series with said vacuum tube, means connecting said iron core coil in series with said vacuum tube, said iron core coil introducing third harmonic distortion into the output of said amplifier in dependence on the D. C. current in said iron core coil, said iron core coil introducing non-linearity of negative curvature into the response of said amplifier to said sawtooth voltage, potentiometer means having end terminals in series with said tube for providing a steady and invariable D. C. bias for said vacuum tube selected to minimize said third harmonic distortion, and means for providing adjustable degeneration for said amplifier of amount selected to compensate said non-linearity.

11. The combination in accordance with claim 10 wherein said fixed and invariable bias is provided by a fixed cathode resistance included in said potentiometer, and wherein said adjustable degeneration is provided by shunting a selectable portion of said resistance with a by-pass condenser.

References Cited in the file of this patent

UNITED STATES PATENTS

| Number | Name | Date |
|---|---|---|
| 2,559,525 | Vance | July 3, 1951 |
| 2,644,105 | Flyer | June 30, 1953 |
| 2,664,523 | Spradlin et al. | Dec. 29, 1953 |